Patented Feb. 17, 1931

1,793,133

UNITED STATES PATENT OFFICE

OTTO RIPKE, OF ELBERFELD, GERMANY, ASSIGNOR TO I. G. FARBENINDUSTRIE AKTIENGESELLSCHAFT, OF FRANKFORT-ON-THE-MAIN, GERMANY

FERTILIZER OBTAINABLE BY HEATING AMMONIUM THIOCYANATE

No Drawing. Application filed May 29, 1928, Serial No. 281,591, and in Germany August 31, 1927.

The present invention concerns the manufacture of fertilizers obtainable by heating ammonium thiocyanate or the primary products resulting from such heating, such as thiourea and guanidine thiocyanate until the evolution of gases has ceased.

In accordance with the invention the products obtainable by heating ammonium thiocyanate or the like, above referred to, until the evolution of gases has ceased are excellent nitrogenous fertilizers.

I prefer to perform the heating at a temperature of about 300° C. but it is to be understood that all temperatures between that at which evolution of ammonia begins and that at which carbonization of the reaction products takes place may be suitable for performing the reaction. The compounds thus obtainable may be used in the form of the original mixture, or individual constituents thereof, or artificial mixtures of these individual constituents with each other or with other soluble or insoluble nitrogenous or nitrogen free fertilizers.

The advantage of these products over the nitrogenous fertilizers, readily soluble in water, lies in the slower assimilation of the nitrogen consequent to the sparing solubility. Thereby injury to the plants is avoided by too generous a supply of nitrogen, whilst a more complete utilization of the fertilizer is achieved, the latter not being washed away by water.

Instead of the mixture of compounds obtained by heating ammonium thiocyanate, the individual compounds contained in this mixture may obviously be used for the same purpose; products of the kind are melam, melem and the like. Likewise these compounds can be used in admixture with one another or as an addition to other water-soluble or insoluble nitrogenous or nitrogen free fertilizers.

I claim:

1. Fertilizers, comprising compounds formed by heating ammoniumthiocyanate until the evolution of gases has ceased.

2. Fertilizers, comprising compounds formed by heating ammoniumthiocyanate until the evolution of gases has ceased at a temperature of about 300° C.

In testimony whereof I have hereunto set my hand.

OTTO RIPKE.